United States Patent

[11] 3,601,350

| [72] | Inventor | Elwood Fry<br>1818 Pennsylvania Ave. W., Warren, Pa. 16365 |
|---|---|---|
| [21] | Appl. No. | 848,631 |
| [22] | Filed | Aug. 8, 1969 |
| [45] | Patented | Aug. 24, 1971 |

[54] RESILIENT MOUNTING FOR VEHICLE SEATS
4 Claims, 5 Drawing Figs.

[52] U.S. Cl. ............................................. 248/399,
248/21, 248/358, 248/430
[51] Int. Cl. .............................................. F16m 1/00
[50] Field of Search ............................................. 248/375,
387, 399, 424, 429, 430, 8, 9, 15, 18, 22, 350, 358,
20, 21; 297/307, 308, 309

[56] References Cited
UNITED STATES PATENTS

| 1,362,041 | 12/1920 | Roe | 248/399 |
|---|---|---|---|
| 2,196,428 | 4/1940 | Saurer | 248/9 |
| 2,351,725 | 6/1944 | Wack | 248/22 |
| 3,037,736 | 6/1962 | James | 248/429 |
| 3,279,737 | 10/1966 | Krause | 248/430 |
| 3,342,447 | 9/1967 | Marsh | 248/21 |
| 3,430,902 | 3/1969 | Lohr | 248/18 |

FOREIGN PATENTS

| 454,639 | 10/1936 | Great Britain | 248/375 |
|---|---|---|---|
| 680,587 | 8/1952 | Great Britain | 248/358 |
| 755,273 | 8/1956 | Great Britain | 248/9 |
| 508,815 | 1/1955 | Canada | 248/358 |
| 1,443,849 | 5/1966 | France | 248/358 |

*Primary Examiner*—Marion Parsons, Jr.
*Attorney*—Berman, Davidson and Berman

ABSTRACT: A device to be interposed between the seat of a vehicle such as a lift truck and the frame of the vehicle, said device comprising a metal plate having rows of apertures, said plate being covered with molded rubber which also fills said apertures, said rubber having projections on one side, each projection being centered on an aperture.

INVENTOR
ELWOOD FRY,
BY
Berman, Davidson & Berman
ATTORNEYS.

INVENTOR.
ELWOOD FRY,
BY
Berman, Davidson & Berman,
ATTORNEYS.

RESILIENT MOUNTING FOR VEHICLE SEATS

In vehicles such as tractors and lift trucks, the wheels customarily are not sprung, since any such springing would interfere with the lifting functions of such vehicle's hydraulic system. In the case of lift trucks, the rubber tires are usually solid and in the case of tractors, the rear tires, at least, are usually filled with a brine and therefore behave much like solid tires. As a result, the operator of the lift truck or tractor, in spite of having an upholstered seat, receives a very rough ride which, in the course of a full day's work, tends to produce considerable fatigue.

It is an object of this invention to provide a resilient intermediary part, secured both to the seat and to the frame of the vehicle so as to mitigate the roughness of the ride.

It is a further object of this invention to provide a device as aforesaid which is easily attachable to existing seats and vehicle frames, which has three-dimensional resiliency, and which has a considerable degree of fore-and-aft adjustment.

Figure 1:
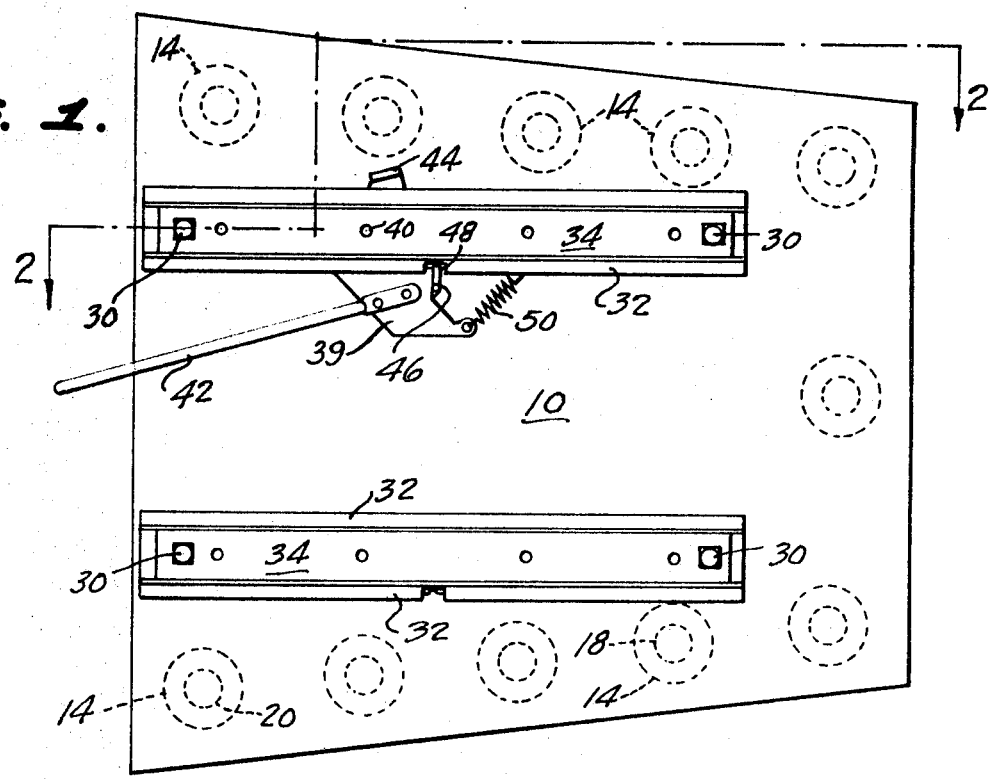
Figure 2:
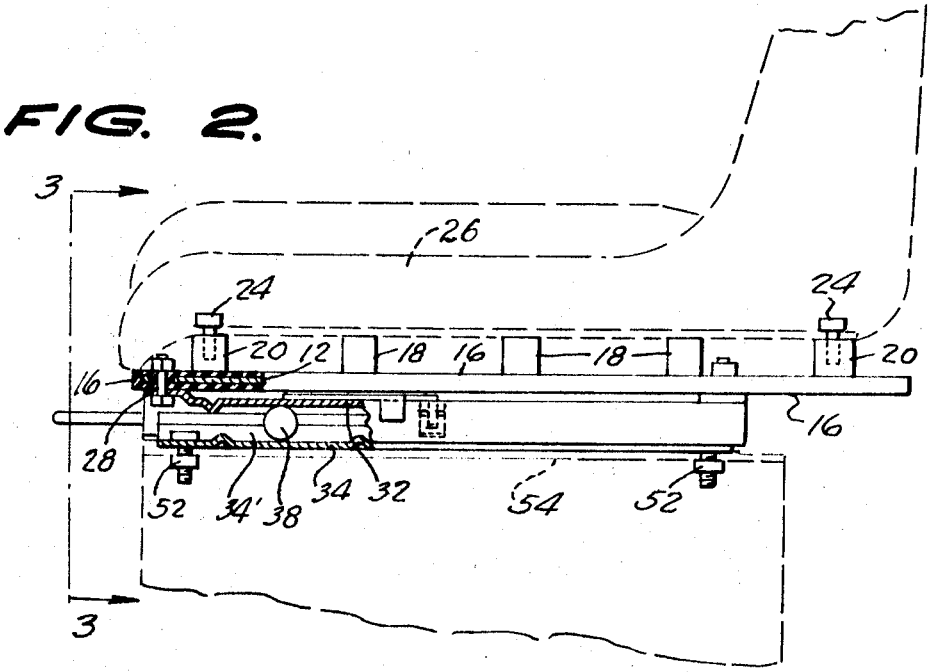
Figure 3:
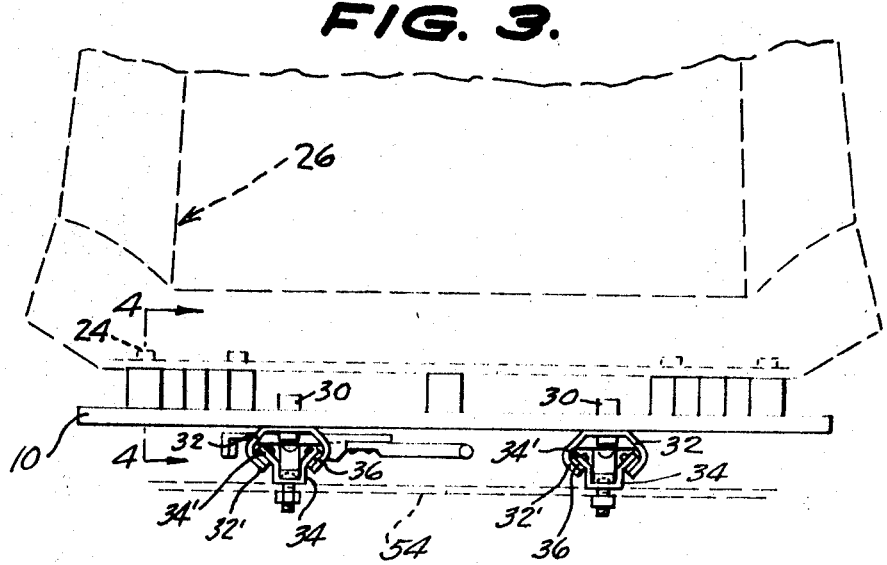
Figure 4:
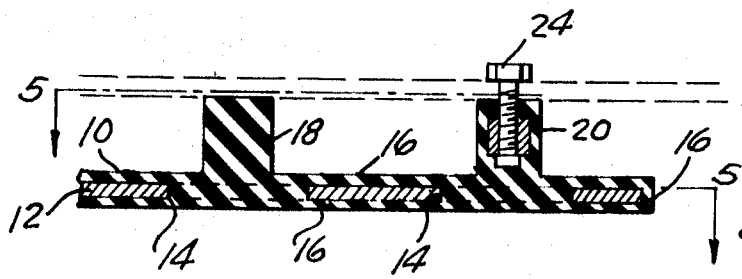
Figure 5:
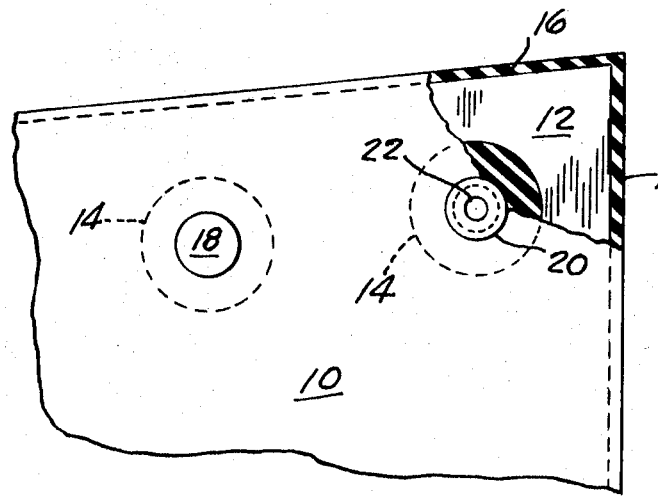

The above and other objects will be made clear from the following detailed description taken in connection with the annexed drawings, in which:

FIG. 1 is a bottom plan view of the improved device;
FIG. 2 is a partial section taken on the line 2—2 of FIG. 1;
FIG. 3 is a front elevation taken on the line 3—3 of FIG. 2;
FIG. 4 is a section taken on the line 4—4 of FIG. 3; and
FIG. 5 is a top plan view partly in section taken on the line 5—5 of FIG. 4.

In FIG. 1 there is shown a baseplate 10 which also appears in every figure of the drawings. As best seen in FIGS. 2, 4 and 5, the base 10 is built on a metal core 12, the plate being formed with rows of apertures 14. The base 10 is formed by placing the plate 12 in a mold, filling the mold with a resilient plastic such as rubber and heating it under pressure to the point of vulcanization. The result is to form on both faces and all edges of the metal plate 12 a coating of rubber 16.

The mold is so formed as to produce rubber projections 18, each of which is centered on a perforation 14 so as not to be directly supported by the metal plate 12. This assures maximum resiliency in all directions of each of the projections 18.

Certain selected projections 20 (FIGS. 4 and 5) have molded therein bushings 22. The bushings 22 are internally threaded for the reception of capscrews 24 which are used to secure the projections and thereby the baseplate 10 to a conventional car seat, indicated by phantom lines 26, in FIGS. 2 and 3.

As shown particularly in FIGS. 1, 2 and 3, the metal plate 12 has other apertures 28 which, in the mold, are cored so that the rubber 16 coats the interior of the apertures. These apertures 28 receive bolts 30 which secure to the baseplate 10 a pair of generally C-shaped channel members 32. The free edges 32' are bent inwardly, as best seen in FIG. 3, to receive slidably generally Y-shaped channel members 34.

The free edges 34' of the Y-shaped channels 34 are bent outwardly so as to lie parallel to but spaced from the flanges 32' of the C-shaped channels 32. Proper spacing is assured by means of plastic, large head screws 36 which are screwed into apertures in flanges 34'.

As best seen in FIG. 2, rollers 38 are inserted between the members 32 and 34 and bear on the central panels of each. This permits relative longitudinal movement to occur between the members 32 and 34.

As best seen in FIG. 1, a plate 39 is pivoted in one of the members 32 and lies between that member and the plate 10. The pivot point is designated 40. A handle 42 is secured to the plate 39 which has at its opposite side a turned-up lug 44 and adjacent the handle 42 a turned-up lug 46. A notch 48 is formed in one flange 32' of the member 32 and receives the lug 46. A series of notches are formed adjacent flange 34' of the Y-shaped channel 32. When the handle 42 is rocked forwardly, in FIG. 1, the lug 46 is disengaged from both sets of notches and accordingly the plate 10 with its channels 32 may be slid forwardly and backwardly to bring the seat 26 to a comfortable position for the operator. The handle 42 is then released and a spring 50 stretched between the plate 39 and the adjacent channel 32 draws the lug 46 into engagement with the appropriate notch in the Y-shaped channel 34.

Bolts 52 pass through the bottom of the Y-shaped channels 32 and engage a portion 54 of the vehicle frame to anchor the entire structure and its attached seat 26 to the vehicle.

It is to be noted in FIGS. 4 and 5 that the projections 18 and 20, which are inherently resilient, rest on an area of pure rubber between the edge of each aperture 14, which permits flexing, particularly in the vertical direction over and above the flexibility or resiliency of the posts 18 and 20. The interengaged channels 32 and 34 are spaced entirely inwardly of the apertures 14 so that the rigidity of their support does not interfere at all with the flexibility of the projections 18 and 20.

No doubt, numerous changes in detail will suggest themselves to one skilled in the art who peruses the specification. It is not intended, therefore, to limit this invention to the precise details disclosed.

What I claim is:

1. A device to be interposed between the seat of a vehicle such as a lift truck and the frame of the vehicle, said device comprising a metal plate having rows of apertures, said plate being covered with molded rubber which also fills said apertures, portions of said rubber forming solid projections on one side, each projection being centered on an aperture and being of less diameter than the aperture on which it is centered.

2. The device of claim 1, in which selected projections have threaded connecting means molded into their upper ends.

3. The device of claim 1, including a pair of C-shaped channel members secured to the side of said plate opposite said projections; a pair of Y-shaped members slidable within said C-shaped members, and antifriction means between said members.

4. The device of claim 3, including means in certain of said projections for securing said plate to a vehicle seat and means on each of said Y-shaped members for securing said members to a vehicle frame.